DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 4

T887,004

METHOD OF MAKING STABILIZED SILVER HALIDE EMULSIONS SENSITIVE TO LIGHT

Albert T. Brault, Kodak Park Works, Rochester, N.Y. 14650

Filed Mar. 16, 1970, Ser. No. 20,118
Int. Cl. G03c *1/02, 5/04, 5/24*
U.S. Cl. 96—27
No Drawing. 17 Pages Specification

Organic onium halides are used to stabilize a silver halide photographic emulsion by forming a stable complex with the silver halide and the emulsion is resensitized by treatment, e.g. at room temperature, with a nucleophile such as water, ammonium hydroxide or pyridine. Thus, stable photographic emulsions can be prepared in the light and rendered light-sensitive just prior to exposure. Also new images can be added to previous images in a convenient "add-on" system. Examples of suitable organic onium halides include tetramethylammonium bromide, tetraethylammonium bromide, butyltriphenylphosphonium bromide, and dodecyldimethylsulfonium iodide. The tetraalkylammonium halides also can increase the stabilization rate of sodium thiosulfate with less staining than occurs when ammonium halides are added to thiosulfate baths. Similarly, tetraalkylammonium thiosulfates are superior to ammonium thiosulfate as stabilizers. Also disclosed is a salt coagulation technique for fine grain emulsions in which the emulsion is warmed to 50–60° C., $Na_2SO_4$ is added, pH is adjusted to below 3, and the emulsion is rapidly cooled to 5° C. to obtain a firm coagulum.